US007734654B2

(12) United States Patent
Carro

(10) Patent No.: US 7,734,654 B2
(45) Date of Patent: Jun. 8, 2010

(54) METHOD AND SYSTEM FOR LINKING DIGITAL PICTURES TO ELECTRONIC DOCUMENTS

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/484,469

(22) Filed: Jul. 11, 2006

(65) Prior Publication Data

US 2007/0043744 A1 Feb. 22, 2007

(30) Foreign Application Priority Data

Aug. 16, 2005 (EP) ................... 05300667

(51) Int. Cl.
*G06F 7/00* (2006.01)
*G06F 17/30* (2006.01)
*H04N 5/76* (2006.01)
*H04N 9/68* (2006.01)

(52) U.S. Cl. .................. 707/795; 348/231.2; 348/236

(58) Field of Classification Search ............. 348/231.2, 348/236; 707/104.1
See application file for complete search history.

(56) References Cited

U.S. PATENT DOCUMENTS

| | | | | |
|---|---|---|---|---|
| 6,757,684 B2 * | 6/2004 | Svendsen et al. | ............... | 707/10 |
| 6,964,025 B2 * | 11/2005 | Angiulo et al. | ............. | 715/838 |
| 7,315,983 B2 * | 1/2008 | Evans et al. | .................. | 715/713 |
| 2003/0030839 A1 | 2/2003 | Walters et al. | ............. | 358/1.15 |
| 2003/0033296 A1 | 2/2003 | Rothmuller et al. | ............ | 707/3 |
| 2003/0093547 A1 | 5/2003 | Scheessele | ................... | 709/231 |
| 2003/0182324 A1 | 9/2003 | Satomi et al. | ............... | 707/203 |
| 2004/0008906 A1 | 1/2004 | Webb | ......................... | 382/306 |
| 2004/0101212 A1 | 5/2004 | Fedorovskaya et al. | ..... | 382/305 |
| 2004/0114042 A1 | 6/2004 | Paolini et al. | .......... | 348/207.99 |
| 2004/0117858 A1 | 6/2004 | Boudreau et al. | ........... | 725/144 |
| 2004/0135815 A1 | 7/2004 | Browne et al. | ............. | 345/810 |
| 2004/0162022 A1 | 8/2004 | Lahetkangas et al. | ...... | 455/41.1 |
| 2004/0183918 A1 | 9/2004 | Squilla et al. | ............. | 348/211.2 |
| 2004/0193428 A1 | 9/2004 | Fruchter et al. | ............. | 704/276 |
| 2004/0201692 A1 | 10/2004 | Parulski et al. | ........... | 348/207.1 |
| 2004/0201740 A1 | 10/2004 | Nakamura et al. | ........ | 348/231.3 |
| 2004/0205286 A1 | 10/2004 | Bryant et al. | .................. | 711/1 |

* cited by examiner

*Primary Examiner*—James Trujillo
*Assistant Examiner*—Jorge A Casanova
(74) *Attorney, Agent, or Firm*—Schmeiser, Olsen & Watts; William H. Steinberg

(57) ABSTRACT

An image of a scene is captured with a digital camera. An item related to the scene is selected on a document stored on an electronic user device. The image is linked to the item and reversibly both on the electronic user device and on the digital camera to allow access to the full information.

18 Claims, 9 Drawing Sheets

METHOD AND SYSTEM FOR LINKING DIGITAL PICTURES TO ELECTRONIC DOCUMENTS

FIELD OF THE INVENTION

The present invention relates to digital photography in general and more particularly, to a system and method for linking a digital image with an electronic document.

BACKGROUND OF THE INVENTION

Digital photography is gradually replacing traditional photography. Digital photography avoids the need for film and film developing, makes it possible to view the images recorded immediately, allows pictures to be distributed and shared worldwide via the Internet, and enables PC-based manipulation and enhancement. Digital photographs can be produced and easily edited using readily available digital image software applications. Furthermore, in contrast to traditional photography, digital photographs are available for viewing and/or use almost immediately by a personal computer (PC), or by a viewing device. A major contributing factor is the emergence of "network cameras". Digital cameras equipped with wireless communications are driving photography into new applications and markets.

Consumers also appreciate digital photography because of their preference for the electronic storage, organization and access of images over the traditional storage on static physical albums. After capturing a collection of pictures by means of a digital camera, users often do not immediately catalog the digital images, but instead opt to upload digital images from the digital camera to an electronic storage device or data storage medium for later use. Accordingly, personal computers, web servers, and other electronic image storage devices are increasingly being used to store digital still images.

As with conventional photography, the need to annotate and catalog the ever-increasing number of digital images is of paramount importance to allow ease of access and use. Thus, the task of classifying or cataloging digital still images on storage devices in a way that they will be easily accessible by the user is becoming increasingly important.

Most methods of archiving and storing digital still images typically require users to remember large amounts of information merely to locate pictures that are of particular interest to them. Under systems currently in use, digital images are organized by uploading such images into a computer and manually organizing the images into files and folders (albums) that are then given appropriate titles by the user. Typically the user needs to arrange the images individually into groups that correspond to a specific theme or event. For example, many users currently store their digital images in the hierarchical, directory-based file system structure of personal computers. To find particular photos stored in such a hierarchical directory tree or structure, users must remember the full pathname to the directory in which these photographs were stored. There are other disadvantages to storing digital photographs in a hierarchical, directory-based file system. For example, cataloging and storing groups of photos by categories requires creating different directories for each of the desired categories. This further increases the amount of information that must be remembered by the user in order to locate desired photos.

Other users create large personal databases to organize digital still images on personal computers. Many computer programs have been developed to help users to do this. However, because of the time and effort necessary to review and categorize images, these databases are typically only rarely used and updated. In fact, even when the users would make the investment of time and energy necessary to organize images into databases, the databases are typically organized according to various predefined categories, such as the date of capture, places, events, people. Even when different, user selectable categories could be used, often such categories do not inherently help the user to easily locate images that are of particular importance or value. Instead the user must remember the image, when the image was captured, and/or in which category the user categorized it.

Another standard method of enabling the annotation of digital images is to generate "metadata" within the image. Image metadata is essentially non-picture data that is stored along with picture information in a file and can include such information as the date and time the picture was taken, whether a flash was used, which camera model was used, camera settings such as zoom and exposure, location information such as GPS-derived data, and audio annotations. For example, an image depicting an athletic competition scene can include a short textual description such as "100-m semifinals, heat 1, Athens-2004 Olympic Games", the name of a person in the image, such as "Gail Devers" or a date and time when the image was captured, such as "03/04/2004 17:28:35".

Various types of metadata related to images have been standardized. For example, the International Organization for Standardization (ISO) group ISO/IEC JTC1/SC29/WG11, "Coding of Moving Pictures and Audio", has published an "MPEG-7 Requirements Document" V.8, No. N2727, March 1999, which defines various types of metadata that can be stored with moving images. Also, the Digital Imaging Group (DIG) has developed the DIG35 metadata standard.

Many Internet image search sites search on metadata content descriptions to locate digital images for display. Some digital cameras automatically generate metadata in the form of a date and time. However, the automatically generated date and time says nothing about the content and/or the event depicted by the digital image and therefore provides only limited assistance in annotating, cataloging and searching for the digital image. For this reason, in the prior art, text entry methods of generating metadata have been applied to annotate large volumes of digital images. Such methods require a person to sort through a database of digital images, using a computer. The user must then store a short textual label within each image, indicating a subject and/or an event depicted by the corresponding digital image. However, the above conventional method is very labor intensive and time consuming. As a result, the step of sorting and labeling captured digital images is often neglected, due to the time required to individually process large volumes of pictures. The photographer therefore accumulates a growing number of images, many of which are not accessible because of the lack of a convenient method of labeling.

Thus, the current systems and methods for annotating, categorizing, and retrieving digital pictures have some drawbacks. Since the successive pictures captured by the user with a digital camera may be quite different and unrelated, the topics of those pictures are listed out of any particular order or context (i.e., without any reference to the reasons or needs that have determined the scene selection). Because of all those deficiencies, while digital cameras are enabling the consumer to take more pictures at a reduced cost, there is a need and an increasing demand for new ways to reference, organize and access these digital images that would be simple and would require a minimum effort by the user.

It would be very helpful and convenient for a user to easily and immediately associate a picture taken, with a subject or category corresponding to the picture.

By example, when a user visits different places on a tour and selects a scene on a visited location and takes a picture, it would be helpful and convenient for the user to easily and immediately associate the picture taken, with information in a travel guide describing the place on which the picture has been taken.

It would be very useful to provide a user means for associating, for instance, the picture taken at a visited town, with the position of this town identified on an electronic map. Conversely, it would be very helpful to provide the user means for associating, for instance, the location of the town, identified on an electronic map, with all pictures taken by the user at that location.

Therefore, there is a need in the art for systems and methods for enhancing digital still images captured by means of a digital camera, with contextual information, whereby information that is immediately meaningful to a user is associated with the images, and selectively available for presentation in conjunction with the visualization of the images.

Conversely, there is also a need in the art for systems and methods for enhancing electronic documents (e.g., web pages, digital maps, electronic guides, etc.), with digital still images captured by means of a digital camera, whereby digital images related to information items that are immediately meaningful to a user are associated, and selectively available for visualization in conjunction with the display of the electronic documents.

OBJECTS AND SUMMARY OF THE INVENTION

It is therefore an object of the invention to provide a solution to document and to reference dynamically "in context", images captured by a digital camera so as to minimize the effort required on the post capture analysis and categorization of the captured images.

It is another object of the present invention to create links between items or points selected by a user on electronic documents (i.e., words, figures, digital maps points) and images captured and stored on a digital camera, to enable the user to retrieve and display on the digital camera, images which are related to items or points selected by the user on electronic documents.

It is yet another object of the present invention to create links between images stored on a digital camera and items or points on electronic documents (i.e., words, figures, digital maps points), to enable the user to access electronic documents, and to display highlighted on said documents, items or points related to the images selected by the user on the digital camera.

According to an aspect of the invention, there is provided a method for linking a digital image to electronic information stored on an electronic user device having a screen, the method comprising the steps of selecting at least one image among a plurality of digital images stored on a digital camera, the at least one image being defined by an image filename and associated metadata, displaying at least one document of interest among a plurality of documents stored on the electronic user device, the at least one document being defined by a document filename, selecting in the displayed at least one document of interest at least one item to be linked to the selected at least one image, transmitting from the digital camera to the electronic user device the image filename and associated metadata of the selected at least one image, creating at the electronic user device an image data object including the image filename and associated metadata of the selected at least one image, and creating on the electronic user device a link between the selected at least one item and the image data object.

According to another aspect of the invention, there is provided a system for linking a digital image to electronic information stored on an electronic user device having a screen, the system comprising means for selecting at least one image among a plurality of digital images stored on a digital camera, the at least one image being defined by an image filename and associated metadata, means for displaying at least one document of interest among a plurality of documents stored on the electronic user device, the at least one document being defined by a document filename, means for selecting in the displayed at least one document of interest at least one item to be linked to the selected at least one image, means for transmitting from the digital camera to the electronic user device the image filename and associated metadata of the selected at least one image, means for creating at the electronic user device an image data object including the image filename and associated metadata of the selected at least one image, and means for creating on the electronic user device a link between the selected at least one item and the image data object.

According to yet another aspect of the invention, there is provided a computer program product stored on a medium readable by an electronic user device, the computer program product tangibly embodying readable program means for causing the electronic user device to carry out a method comprising the steps of selecting at least one image among a plurality of digital images stored on a digital camera, the at least one image being defined by an image filename and associated metadata, displaying at least one document of interest among a plurality of documents stored on the electronic user device, the at least one document being defined by a document filename, selecting in the displayed at least one document of interest at least one item to be linked to the selected at least one image, transmitting from the digital camera to the electronic user device the image filename and associated metadata of the selected at least one image, creating at the electronic user device an image data object including the image filename and associated metadata of the selected at least one image, and creating on the electronic user device a link between the selected at least one item and the image data object.

According to still yet another aspect of the invention, there is provided a computer program product stored on a medium readable by a digital camera, the computer program product tangibly embodying readable program means for causing the digital camera to carry out a method comprising the steps of selecting at least one image among a plurality of digital images stored on a digital camera, the at least one image being defined by an image filename and associated metadata, displaying at least one document of interest among a plurality of documents stored on the electronic user device, the at least one document being defined by a document filename, selecting in the displayed at least one document of interest at least one item to be linked to the selected at least one image, transmitting from the digital camera to the electronic user device the image filename and associated metadata of the selected at least one image, creating at the electronic user device an image data object including the image filename and associated metadata of the selected at least one image, and creating on the electronic user device a link between the selected at least one item and the image data object.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE INVENTION

The present invention is directed to overcoming one or more of the problems set forth above. To this purpose the present invention provides a convenient way to combine the information handling and document editing capability of personal electronic device (such as electronic agendas, PDAs and wearable computers) with the image recording and image storage capabilities of modern digital cameras, so that a photographed item can be easily related to additional relevant information about the item.

The present invention discloses a system, a method and a computer program product for linking an image captured by a user (e.g., by means of a digital camera) to an item selected by the user on an electronic document (e.g., a document stored and displayed on a PDA) and reversibly. The present invention also allows access from an item of an electronic document a related image stored on a digital camera. Finally, the present invention also allows access from an image stored on a digital camera to the associated electronic document item stored on an electronic device.

Accordingly, the present invention in its commercial form is provided as a computer program product and a digital camera program product, including readable media having recorded thereon programs, for linking metadata within a plurality of digital images to items of electronic documents, and for linking items of electronic documents to digital images.

Figure 9:
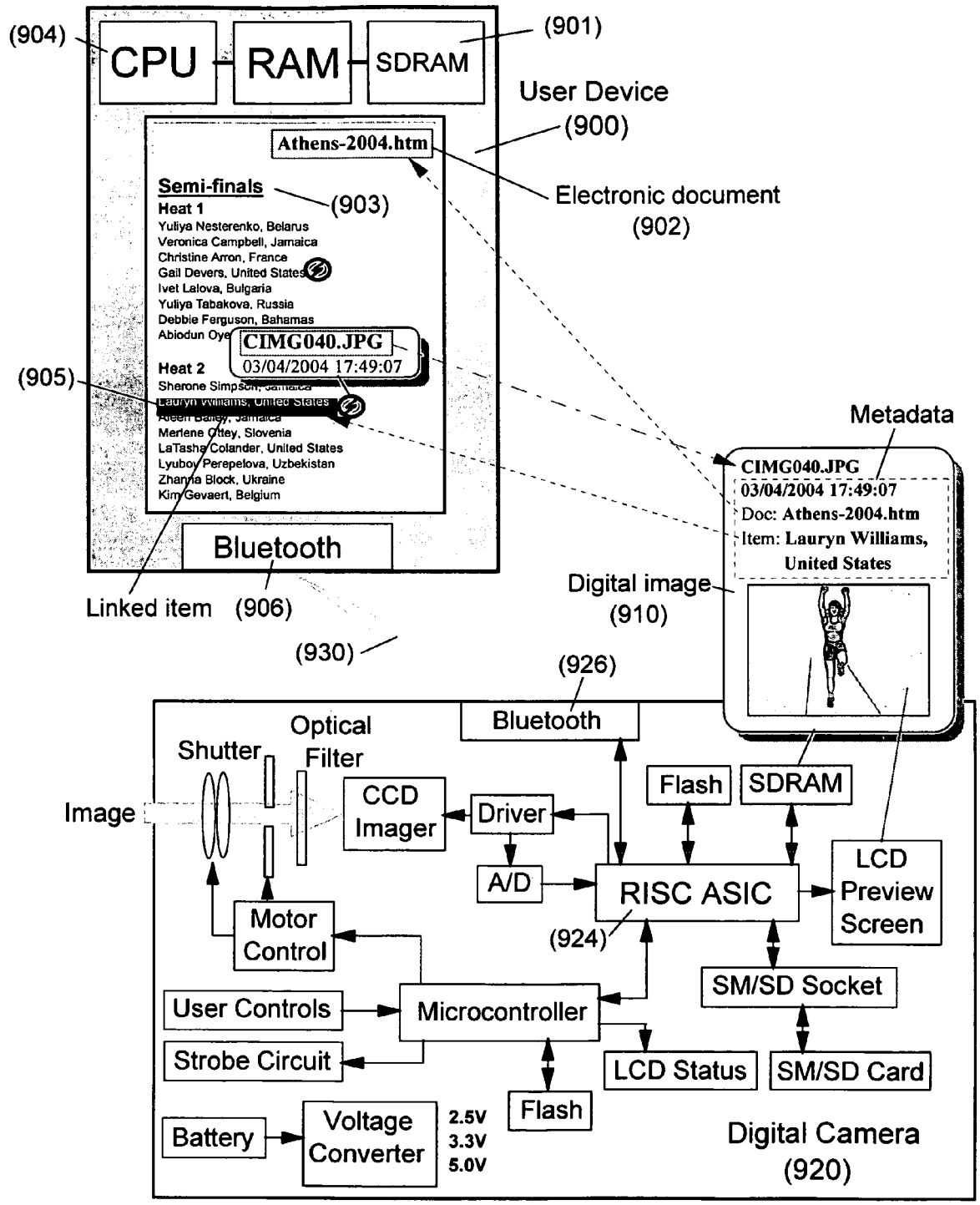
FIG. 9 illustrates the main components of the system of the present invention.

System of the Invention:

FIG. 9 shows the main components of the system of the invention, illustrating the mechanism for linking digital images to items of electronic documents, according to the methods described herein.

The system is a combination of an electronic device (900), a digital camera (920) and a communication link (930). The electronic device allows storing, processing and displaying of an electronic document (902) having content event (903) related to a digital picture (910) subject, the picture being captured by the digital camera (920). Electronic document (902) may contain description (monuments, history, people) of the site where picture (910) is taken, or of an event (903) taking place on the site where the picture is taken.

It can be appreciated that the digital camera may be any modern digital camera wherein the specific features used by the present invention have been implemented. For example, to cite at least one the camera from Toshiva America Electronic Components, Inc. (TAEC), may be modified to include a Bluetooth functional block (926) to allow a communication link (930).

Communication link (930) between the electronic device and the digital camera is preferably a wireless communication link.

The main steps of the method of the present invention linking picture (910) to a document item (905) can be operated through a processor device (904) implemented in user device (900).

The main steps of the method of the present invention linking a picture to a document item can be operated through a processor device (924) implemented on digital camera (920).

User device (900) and digital camera (920) can include wireless transceivers (906, 926) configured to conduct short range wireless communications. For example, both devices can be Bluetooth-enabled or infra-red (IR), to avoid cable connections in local communication, or may be configured to communicate using any other appropriate short range wireless communications protocol such as a wireless communications protocol selected from the 802.11 family of protocols. Advantageously, the Bluetooth technology connects nearby devices at a data rate of 1 Mbps. It automatically searches and connects devices within its radio range (10 m).

Figure 1:
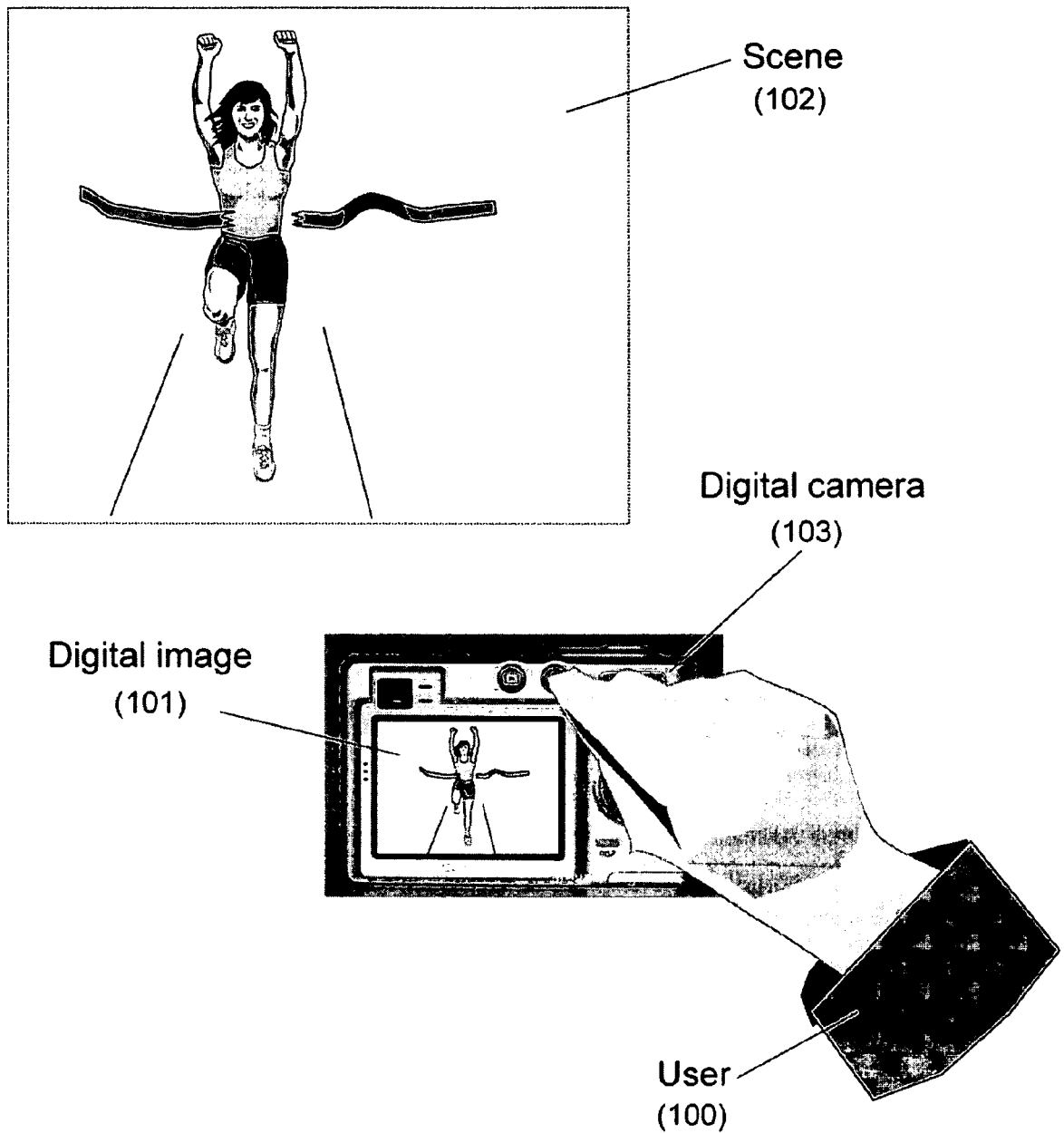
FIG. 1 shows how a user can capture an image of a scene by means of a digital camera.

Linking Digital Pictures to Electronic Documents:

For the sake of simplicity, a unique scenario as shown on FIG. 1 describes the different possible link creations. FIG. 1 illustrates a user (100) using a digital camera (103) for capturing an image (101) of a scene (102), for example, the finish of the 100-m semifinals, heat 1, on Athens-2004 Olympic Games, showing the winner: "Gail Devers".

Figure 2:
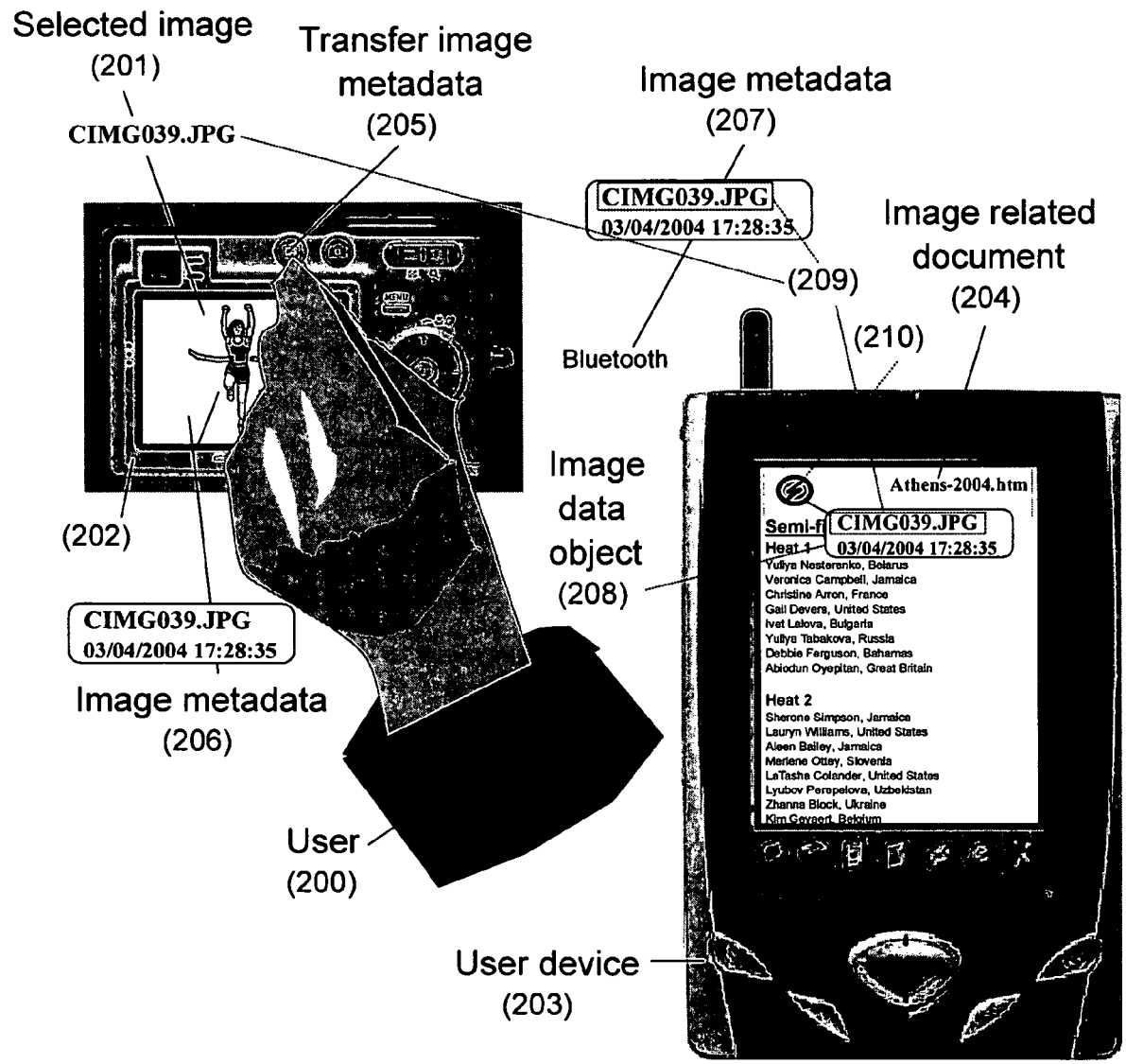
FIG. 2 illustrates the method disclosed for linking a digital picture to an electronic document, according to the present invention.

In FIG. 2, the process for linking the digital image to an item of the electronic document is shown. The user (200) selects an image (201) on a digital camera (202), (e.g., picture (101) just taken). The user selects on a personal user device (203) (e.g., a PDA, a wearable computer, a digital appliance, an electronic agenda, integrated or separated from the digital camera) and a document (204) (e.g., a program of the athletic events listing the names of the athletes scheduled to participate on the women 100-m semi-final series on Athens-2004 Olympic Games). The document selected is chosen as being related to the subject-matter of image (201) selected on digital camera (202). In the embodiment exemplified in FIG. 2, the user transmits 'metadata' information (206) associated with selected digital image (201) by means of an input gesture (205) i.e., by pushing a control button on digital camera (202). The 'metadata' is extracted from the digital image file on the digital camera and is wirelessly transmitted (207) from digital camera (202) to user device (203). When metadata information (206) is received at user electronic device (203), an image data object (208) associated with selected document (204) is created. The image data object references an image filename (209) and associated metadata (207). An icon (210) associated with created image data object (208) is displayed on user device (203) to confirm the link.

It should be noted that in this process, digital image file (201) of the selected image is not transmitted, but only 'metadata' (206) of the image is transmitted from digital camera (202) to user device (203).

Figure 3:
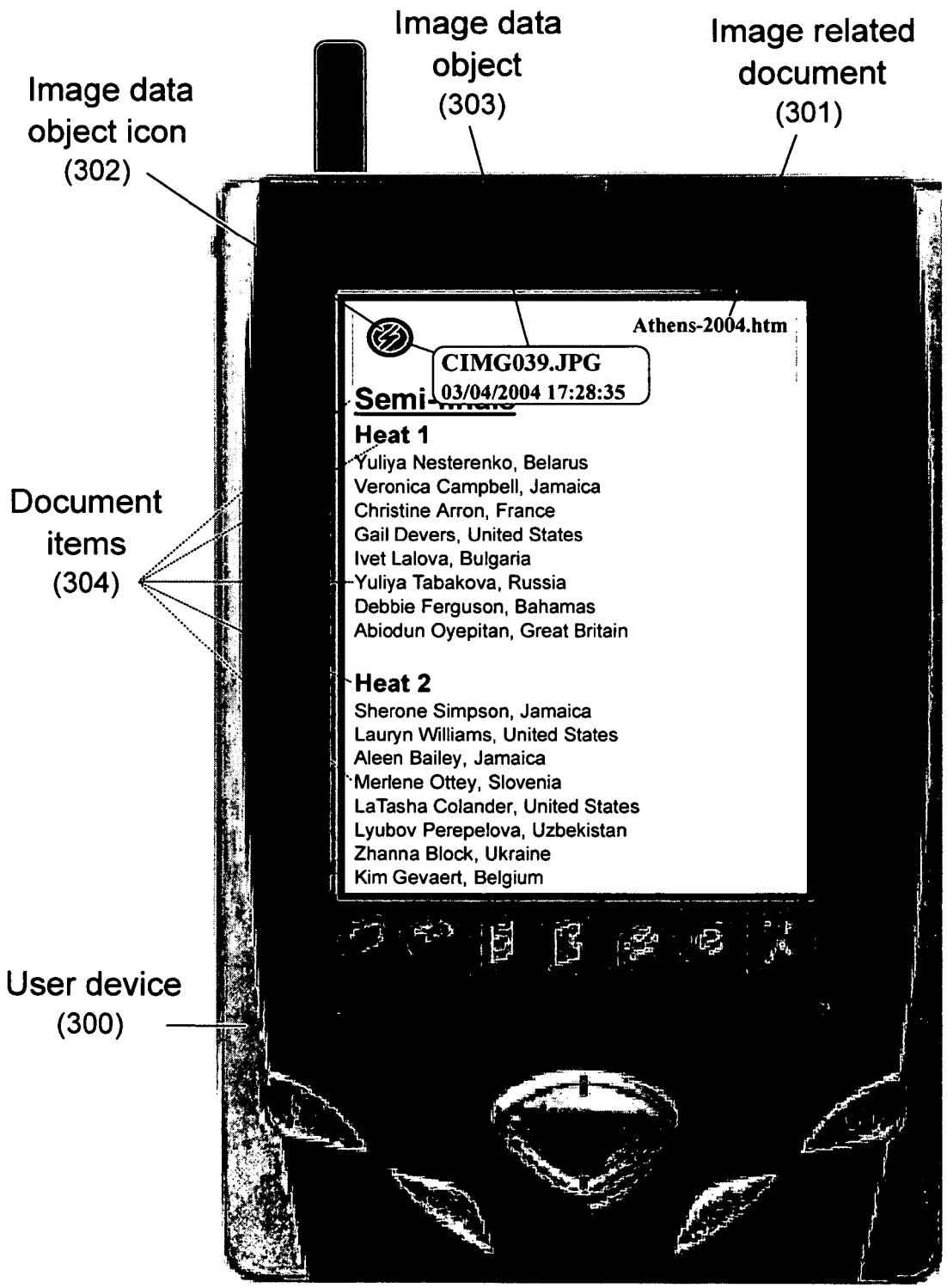
FIG. 3 illustrates an example of a document displayed on a user device, comprising items that reference or are related to pictures taken by the user with a digital camera.

FIG. 3 is an enlarged view of a document (301), the program of a specific athletic event namely the women's 100-m semi-final series at the Athens-2004 Olympic Games displayed on a user device (300). Electronic document (301) comprises a plurality of items (304), such as the names of the athletes competing in the 100-m semi-finals heats, that reference or are related to the selected picture taken by the user. An icon (302) corresponding to an image data object (303) associated to the selected picture is also shown. Image data object (303) corresponding to icon (302) contains the metadata of the selected image which has been previously transmitted from the digital camera to the user device.

Figure 4:
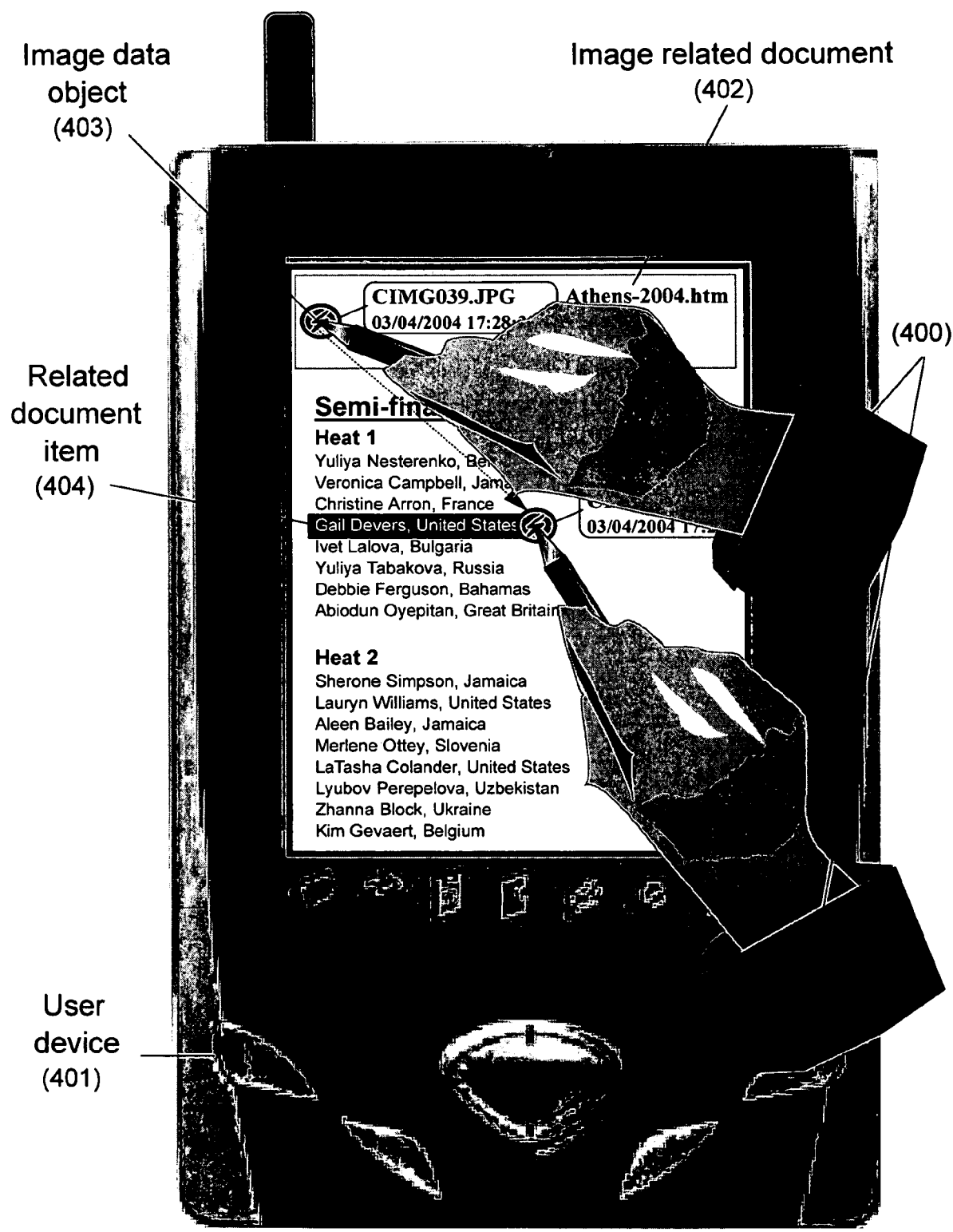
FIG. 4 illustrates the method disclosed for linking a document item to an image, according to the present invention.

FIG. 4 illustrates the steps for creating a link at the electronic device from an item selected in the electronic document to a digital image selected on the digital camera. After capturing an image with the digital camera, a user (400) identifies or edits (i.e., by typing) a document item (404) (e.g., the name of the winner "Gail Devers" of the 100-m semi-finals, heat 1 on Athens-2004 Olympic Games). Then, by means of a first input gesture the user marks on image related document (402) selected (or edited) document item (404) (e.g. by highlighting the phrase "Gail Devers, United States") and, by means of a second input gesture, user (400) drags and drops the icon of image data object (403) in the vicinity of highlighted item (404). It is to be appreciated by a person of ordinary skill in the art that the marking operation is to be interpreted as a general pointing operation to be realized by means of any type of pointing device. Similarly, the second input gesture of the user may be to point on the icon of the image data object to drag and drop it into a selected location of the document, preferably in the vicinity of highlighted item (404).

Figure 5:
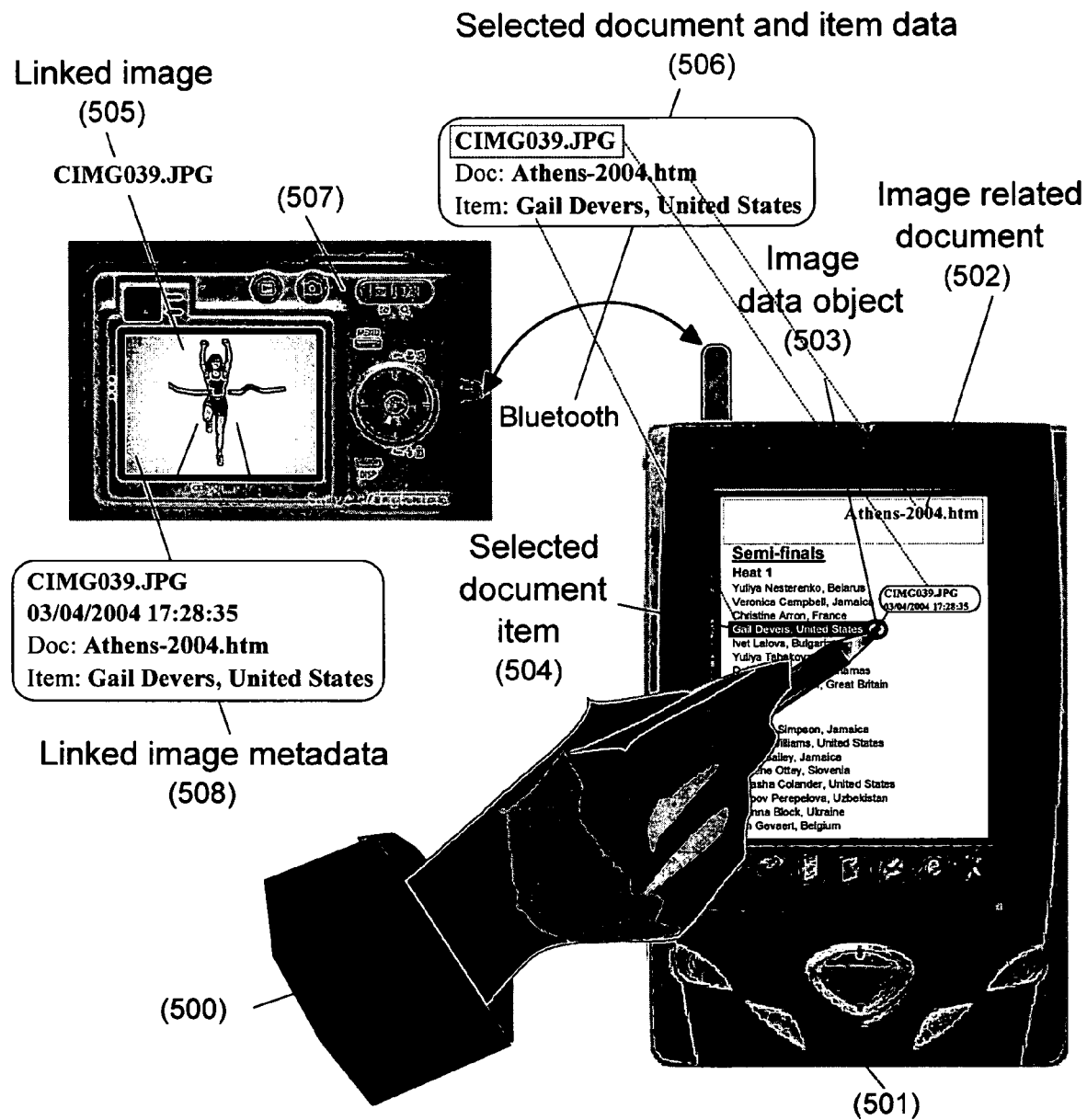
FIG. 5 illustrates how an item selected into an electronic document is linked to an image data object.

Referring to FIG. 5, the steps for allowing the link previously created between the item selected on the electronic document and the image data object to be recognized by the digital camera will now be described. After the user has dragged the image data object icon right near the selected document item, a link is created between the document item and the image data object. This can be done, for instance, by copying in reserved fields of an image data object (503), apart from the image file name and metadata extracted and imported from the digital image file, the information identifying a linked document (502) (e.g. Filename "Athens-2004.htm") and information identifying linked document item (504) (e.g., "Gail Devers, United States"), or linked document position coordinates. A reference to the linked image is wirelessly transmitted (506) from a user device (501) to a digital camera (507). The reference preferably contains the image filename (the "CIMG039.JPG" filename), information identifying selected document (502) (here the linked document filename "Athens-2004.htm") and information identifying selected document item (504). The latter may be a word, a phrase ("Gail Devers, United States") or the document position. Once received, the data referencing linked document (502) and linked document (504) item are stored as "metadata" (508) of a linked image (505), thereby creating a link from the selected document item to selected image (505).

Figure 6:
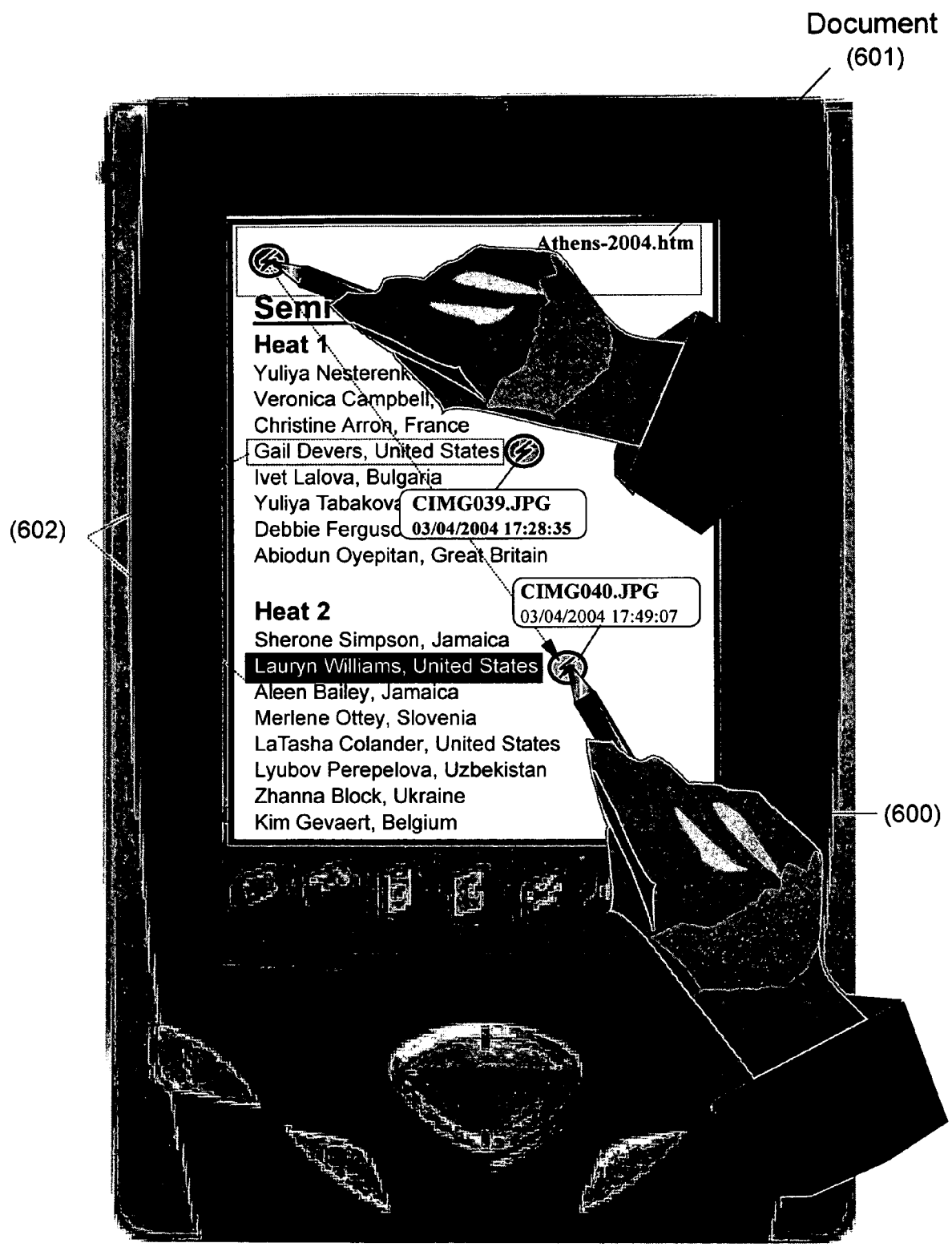
FIG. 6 illustrates how a plurality of images stored on a digital camera are linked to different items of the same or different electronic documents.

It is to be appreciated by a person of ordinary skill in the art, that similar processes may be derived to create several links between a plurality of digital images stored on a digital camera and different items located on the same or several documents. As shown in FIG. 6, a first digital image identified by a filename "CIMG039.JPG" is linked to a first item "Gail Devers, United States" and a second digital image identified by a filename "CIM040.JPG" is linked to a second item "Lauryn Williams, United States" both of the same document (601). However, the items may also be part of different documents.

Figure 7:
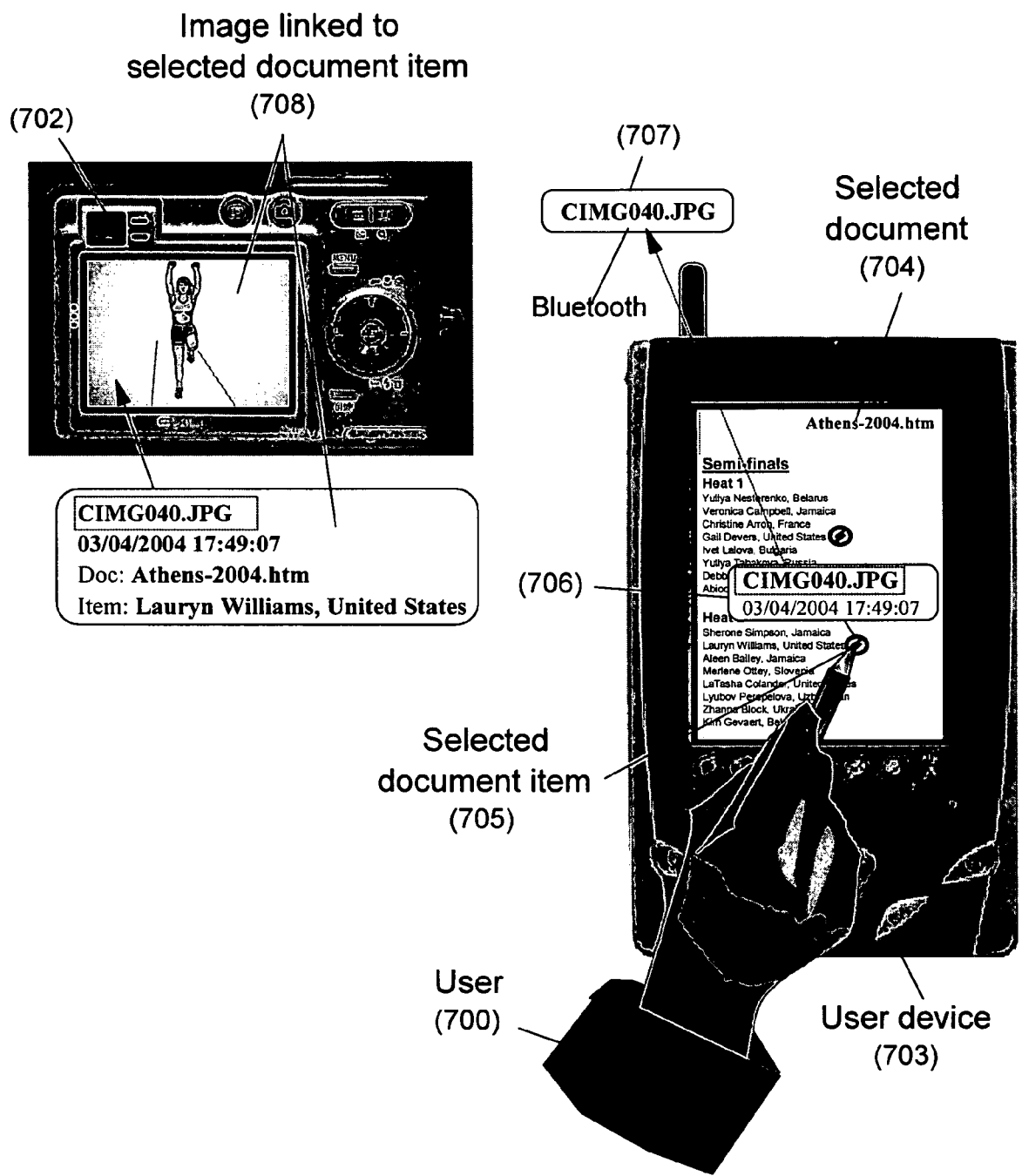
FIG. 7 illustrates how an image linked to a document item selected on the electronic device is displayed on a digital camera.

Displaying Pictures Linked to Documents Items:

FIG. 7 illustrates the steps for accessing and displaying on a digital camera a digital image linked to an item of a document selected by a user on a user device. When a user (700) points to a document (704) that is displayed on a personal device (703) by an icon of an image data object, filename and metadata (706) of the linked image are displayed on the device. If the user clicks on the icon (or performs another type of selection action), a filename (707) of the linked image (here "CIMG039.JPG") is wirelessly transmitted from user device (703) to a digital camera (702). From the filename, an image picture (708) linked to a selected document item (705) is retrieved from the file system of digital camera (702) and is displayed to user (700).

Figure 8:
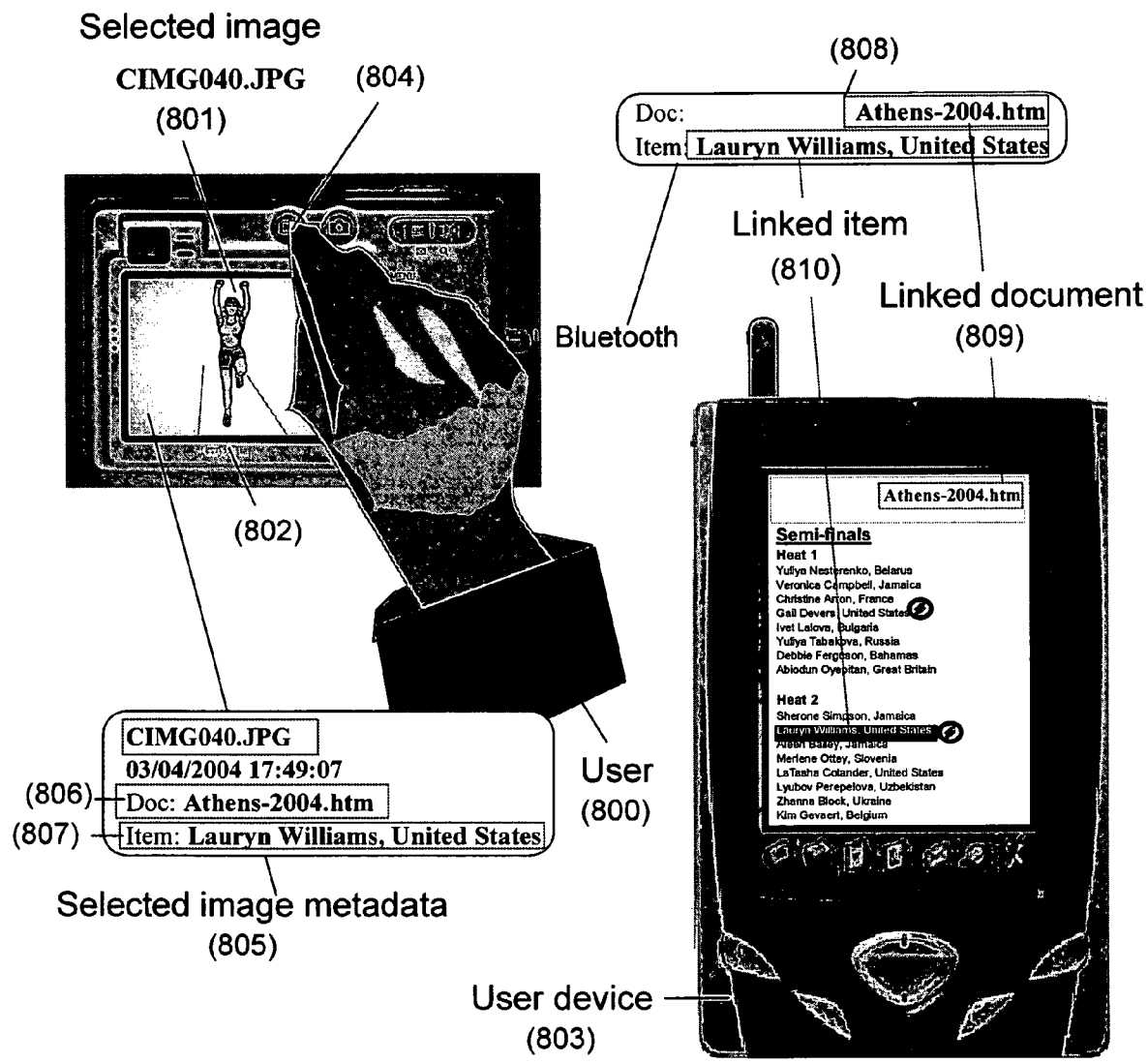
FIG. 8 illustrates how a document item linked to an image selected on the digital camera is displayed on an electronic device.

Displaying Documents Items Linked to Pictures:

FIG. 8 illustrates the steps for accessing and displaying on a personal device an item of a document linked to an image selected by the user on a digital camera. When a user (800) selects an operation (804) an image (801) on a digital camera (802), the filename of a document (806) ("Athens-2004.htm") and the reference of a document item (807) ("Lauryn Williams, United States") which are linked to the selected image are extracted from image metadata (805). Next, the filename of the document and the reference of the document item are wirelessly transmitted (808) from digital camera (802) to a user device (803). The data received is automatically parsed by user device (803) to extract filename (806). The linked document ("Athens-2004.htm") is then retrieved and displayed (809). Moreover, from the received reference of document item (807), a linked document item (810) ("Lauryn Williams, United States") is identified, displayed, and highlighted to user (800) on the same document.

Computer Programs:

A first computer program is loaded into an electronic user device from a computer-readable medium such as a magnetic disk or tape, optical disk, DVD, or network storage-media (when downloaded from a communications network for example). The computer program comprises instructions for carrying out at least the following steps when executed on the electronic user device:

selecting and displaying an electronic document having a plurality of items;

selecting in the displayed electronic document at least one item to be linked to a digital image;

creating an image data object from an image filename and associated metadata received from a digital camera; and creating a link between the selected at least one item and the image data object.

A second computer program is loaded into a digital camera from a computer-readable medium such as a magnetic disk or tape, optical disk, DVD, or network media (when downloaded from a communications network for example). The computer program comprises instructions for carrying out at least the following steps when executed on the digital camera:

selecting an image on the digital camera, the image having an image filename and associated metadata;

extracting from the metadata, a document filename and an item reference previously received from an electronic user device implementing the first computer program; and transmitting to the electronic user device, the document filename and the item reference.

What is claimed is:

1. A method for linking a digital image to electronic information stored on an electronic user device, the method comprising the steps of:

selecting an image among a plurality of digital images stored on a digital camera, the image being defined by an image filename and associated metadata, the image remaining in the digital camera and not transmitted from the digital camera;

after said selecting the image, displaying a document of a plurality of documents stored on the electronic user device, the document being defined by a document filename, the document comprising a plurality of items;

after said displaying the document, selecting an item of the plurality of items in the displayed document, said selected item to be linked to the selected image;

after said selecting the item, transmitting from the digital camera to the electronic user device the image filename and associated metadata of the selected image;

after said transmitting the image filename and associated metadata, creating at the electronic user device an image data object, the image data object comprising the image filename and associated metadata of the selected image;

after said creating the image data object, displaying an icon on the electronic user device in a vicinity of the selected item, wherein the icon is associated with the image data object;

after said displaying an icon, creating on the electronic user device a link between the selected item and the image data object, said creating the link comprising copying the document filename and the selected item into the image data object;

after said creating the link between the selected item and the image data object, transmitting from the electronic user device to the digital camera the document filename and a reference associated to the selected item; and after said transmitting the document filename and the reference, copying into the image metadata of the selected image the document filename and the reference associated to the selected item, thus linking on the digital camera the selected image to the selected item.

2. The method of claim 1, wherein the selected item consists of text.

3. The method of claim 1, wherein after said copying into the image metadata:

the electronic user device is configured to respond to a choosing of the icon on the electronic user device, by sending to the digital camera the image filename residing in the image data object; and the digital camera is configured to respond to a receiving by the digital camera of the image filename sent by the electronic user device, by displaying the selected image.

4. The method of claim 1, wherein after said copying into the image metadata:

responsive to a choosing of the icon on the electronic user device, said electronic user device sending to the digital camera the image filename residing in the image data object; and responsive to a receiving by the digital camera of the image filename sent by the electronic user device, said digital camera displaying the selected image.

5. The method of claim 1, wherein after said copying into the image metadata:

the digital camera is configured to respond to a choosing of the selected image on the digital camera, by extracting the document filename and the reference from the image metadata and sending the extracted filename and reference to the electronic user device; and the electronic user device is configured to respond to a receiving by the electronic user device of the extracted filename and reference sent by the digital camera, by displaying the selected item to which the reference is associated.

6. The method of claim 1, wherein after said copying into the image metadata:

responsive to a choosing of the selected image on the digital camera, said digital camera extracting the document filename and the reference from the image metadata and sending the extracted filename and reference to the electronic user device; and responsive to a receiving by the electronic user device of the extracted filename and reference sent by the digital camera, said digital camera displaying the selected item to which the reference is associated.

7. A system comprising an electronic user device and a digital camera, said electronic user device comprising a first processor and a first computer readable memory unit coupled to the first processor, said digital camera comprising a second processor and a second computer readable memory unit coupled to the second processor, said first computer readable memory unit containing first computer readable program code, said second computer readable memory unit containing second computer readable program code, said first computer readable program code and said second computer readable program code configured to be executed by the first processor and the second processor, respectively, to collectively implement a method for linking a digital image to electronic information stored on the electronic user device, said method comprising:

selecting an image among a plurality of digital images stored on the digital camera, the image being defined by an image filename and associated metadata, the image remaining in the digital camera and not transmitted from the digital camera;

after said selecting the image, displaying a document of a plurality of documents stored on the electronic user device, the document being defined by a document filename, the document comprising a plurality of items;

after said displaying the document, selecting an item of the plurality of items in the displayed document, said selected item to be linked to the selected image;

after said selecting the item, transmitting from the digital camera to the electronic user device the image filename and associated metadata of the selected image;

after said transmitting the image filename and associated metadata, creating at the electronic user device an image data object, the image data object comprising the image filename and associated metadata of the selected image;

after said creating the image data object, displaying an icon on the electronic user device in a vicinity of the selected item, wherein the icon is associated with the image data object;

after said displaying an icon, creating on the electronic user device a link between the selected item and the image data object, said creating the link comprising copying the document filename and the selected item into the image data object;

after said creating the link between the selected item and the image data object, transmitting from the electronic user device to the digital camera the document filename and a reference associated to the selected item; and after said transmitting the document filename and the reference, copying into the image metadata of the selected image the document filename and the reference associated to the selected item, thus linking on the digital camera the selected image to the selected item.

8. The system of claim 7, wherein the selected item consists of text.

9. The system of claim 7, wherein after said copying into the image metadata:
the electronic user device is configured to respond to a choosing of the icon on the electronic user device, by sending to the digital camera the image filename residing in the image data object; and
the digital camera is configured to respond to a receiving by the digital camera of the image filename sent by the electronic user device, by displaying the selected image.

10. The system of claim 7, wherein after said copying into the image metadata:
responsive to a choosing of the icon on the electronic user device, said electronic user device sending to the digital camera the image filename residing in the image data object; and
responsive to a receiving by the digital camera of the image filename sent by the electronic user device, said digital camera displaying the selected image.

11. The system of claim 7, wherein after said copying into the image metadata:
the digital camera is configured to respond to a choosing of the selected image on the digital camera, by extracting the document filename and the reference from the image metadata and sending the extracted filename and reference to the electronic user device; and
the electronic user device is configured to respond to a receiving by the electronic user device of the extracted filename and reference sent by the digital camera, by displaying the selected item to which the reference is associated.

12. The system of claim 7, wherein after said copying into the image metadata:
responsive to a choosing of the selected image on the digital camera, said digital camera extracting the document filename and the reference from the image metadata and sending the extracted filename and reference to the electronic user device; and
responsive to a receiving by the electronic user device of the extracted filename and reference sent by the digital camera, said digital camera displaying the selected item to which the reference is associated.

13. Storage media consisting of a first computer readable storage medium of an electronic user device and a second computer readable storage medium of a digital camera, said first computer readable storage medium having first computer readable program code stored therein, said second computer readable storage medium having second computer readable program code stored therein, said first computer readable program code and said second computer readable program code configured to be executed by a first processor of the electronic user device and a second processor of the digital camera, respectively, to collectively implement a method for linking a digital image to electronic information stored on the electronic user device, said method comprising:

selecting an image among a plurality of digital images stored on the digital camera, the image being defined by an image filename and associated metadata, the image remaining in the digital camera and not transmitted from the digital camera;

after said selecting the image, displaying a document of a plurality of documents stored on the electronic user device, the document being defined by a document filename, the document comprising a plurality of items;

after said displaying the document, selecting an item of the plurality of items in the displayed document, said selected item to be linked to the selected image;

after said selecting the item, transmitting from the digital camera to the electronic user device the image filename and associated metadata of the selected image;

after said transmitting the image filename and associated metadata, creating at the electronic user device an image data object, the image data object comprising the image filename and associated metadata of the selected image;

after said creating the image data object, displaying an icon on the electronic user device in a vicinity of the selected item, wherein the icon is associated with the image data object;

after said displaying an icon, creating on the electronic user device a link between the selected item and the image data object, said creating the link comprising copying the document filename and the selected item into the image data object;

after said creating the link between the selected item and the image data object, transmitting from the electronic user device to the digital camera the document filename and a reference associated to the selected item; and after said transmitting the document filename and the reference, copying into the image metadata of the selected image the document filename and the reference associated to the selected item, thus linking on the digital camera the selected image to the selected item.

14. The storage media of claim 13, wherein the selected item consists of text.

15. The storage media of claim 13, wherein after said copying into the image metadata:
the electronic user device is configured to respond to a choosing of the icon on the electronic user device, by sending to the digital camera the image filename residing in the image data object; and
the digital camera is configured to respond to a receiving by the digital camera of the image filename sent by the electronic user device, by displaying the selected image.

16. The storage media of claim 13, wherein after said copying into the image metadata:
responsive to a choosing of the icon on the electronic user device, said electronic user device sending to the digital camera the image filename residing in the image data object; and
responsive to a receiving by the digital camera of the image filename sent by the electronic user device, said digital camera displaying the selected image.

17. The storage media of claim 13, wherein after said copying into the image metadata:

the digital camera is configured to respond to a choosing of the selected image on the digital camera, by extracting the document filename and the reference from the image metadata and sending the extracted filename and reference to the electronic user device; and the electronic user device is configured to respond to a receiving by the electronic user device of the extracted filename and reference sent by the digital camera, by displaying the selected item to which the reference is associated.

18. The storage media of claim 13, wherein after said copying into the image metadata:

responsive to a choosing of the selected image on the digital camera, said digital camera extracting the document filename and the reference from the image metadata and sending the extracted filename and reference to the electronic user device; and responsive to a receiving by the electronic user device of the extracted filename and reference sent by the digital camera, said digital camera displaying the selected item to which the reference is associated.

* * * * *